(12) United States Patent
Stow

(10) Patent No.: US 11,429,739 B2
(45) Date of Patent: Aug. 30, 2022

(54) SECURE DATA ACCESS IN AN IMMUTABLE LEDGER SYSTEM

(71) Applicant: Ordnance Survey Limited, Southampton (GB)

(72) Inventor: David Charles Alexander Stow, Southampton (GB)

(73) Assignee: Ordnance Survey Limited, Southampton (GB)

(*) Notice: Subject to any disclaimer, the term of this patent is extended or adjusted under 35 U.S.C. 154(b) by 72 days.

(21) Appl. No.: 16/877,676

(22) Filed: May 19, 2020

(65) Prior Publication Data
US 2020/0372168 A1 Nov. 26, 2020

(30) Foreign Application Priority Data
May 21, 2019 (EP) ..................................... 19175738

(51) Int. Cl.
*H04L 29/06* (2006.01)
*G06F 21/62* (2013.01)
*H04L 9/06* (2006.01)
*H04L 9/16* (2006.01)
*H04L 9/32* (2006.01)
*H04L 9/00* (2022.01)

(52) U.S. Cl.
CPC ........ *G06F 21/6227* (2013.01); *H04L 9/0643* (2013.01); *H04L 9/16* (2013.01); *H04L 9/3247* (2013.01); *G06F 2221/2115* (2013.01); *H04L 9/50* (2022.05)

(58) Field of Classification Search
None
See application file for complete search history.

(56) References Cited

U.S. PATENT DOCUMENTS 5,673,319 A * 9/1997 Bellare ................. H04L 9/0637
380/259
7,536,549 B2 * 5/2009 Ishizaki .............. G06F 21/6227
713/167

(Continued)

FOREIGN PATENT DOCUMENTS

WO 2017090041 A1 6/2017

OTHER PUBLICATIONS

Extended EP Search Report—Application No. 19175738.4—dated Oct. 28, 2019—12 pages.

*Primary Examiner* — Maung T Lwin
(74) *Attorney, Agent, or Firm* — Banner & Witcoff, Ltd.

(57) ABSTRACT

A method and system that enables a data owner to write data in an encrypted manner to an immutable ledger, and yet still be able to grant read access to specific data elements, as they were written at particular moments in time, to a requesting party. Examples therefore provide a process for encryption of data onto an immutable ledger in a time indexed manner, together with a process by which a third party can request access to the data stored in the immutable ledger from the data owner, and the data owner can provide them with certain decryption keys that allow the third party to read the data directly from the immutable ledger, again based on time-indexed queries. The data the third party can read is restricted to specific elements only of the data written, and further restricted to within a time range or to a specific point in time.

14 Claims, 5 Drawing Sheets

(56) References Cited

U.S. PATENT DOCUMENTS

| | | | |
|---|---|---|---|
| 7,865,730 B2* | 1/2011 | Cortez | H04L 9/302 |
| | | | 713/171 |
| 8,675,871 B2* | 3/2014 | Arnold | H04L 9/0894 |
| | | | 380/44 |
| 9,251,355 B2* | 2/2016 | Freeman | G06F 21/6227 |
| 9,967,334 B2* | 5/2018 | Ford | H04L 67/20 |
| 2002/0019934 A1* | 2/2002 | Ishizaki | G06F 21/6227 |
| | | | 713/193 |
| 2012/0311324 A1* | 12/2012 | Arnold | H04L 9/0894 |
| | | | 713/159 |
| 2015/0039901 A1* | 2/2015 | Freeman | G06F 21/6227 |
| | | | 713/189 |
| 2018/0343114 A1* | 11/2018 | Ben-Ari | H04L 9/06 |
| 2018/0351750 A1 | 12/2018 | Pattanaik et al. | |
| 2019/0379647 A1* | 12/2019 | Li | H04L 63/108 |

\* cited by examiner

SECURE DATA ACCESS IN AN IMMUTABLE LEDGER SYSTEM

CROSS REFERENCE TO RELATED CASES

This case claims priority to EP Application No. 19175738.4, filed May 21, 2019, entitled "Method and System for Granting Access to Data in an Immutable Ledger System", herein incorporated by reference in its entirety.

FIELD

The disclosure relates to a method and system that provides for secure access by third party users to data held in an immutable ledger system such as a blockchain or hashchain that is maintained by a different party.

BACKGROUND

There are well known encryption technologies that enable an owner of data to write the data to a database such that it can then only be read by the data owner. Moreover, where the data is to be readable by a number of people, then access control technologies exist that enable the application to determine who can read the data and grant or deny access.

However, where data is written to an immutable distributed ledger technology, such as blockchain, the mechanisms by which grant of access to the data are less mature and access control is often on an all or nothing basis, or is implemented at an application layer that is less secure than the data that it is protecting.

One example prior art document is US2018/351750. Within this document a single symmetric key is generated and used for each party, or for each sub-party that wishes to access data in the ledger. In particular, FIG. 3 of US2018/351750 depicts an example process of generating encrypted symmetric keys. Generally, a symmetric key generation module generates a symmetric key and a key encryption module encrypts the symmetric key using different public keys in order to obtain different encrypted symmetric keys that all derive from the same symmetric key. In one embodiment, the symmetric key generation module generates a symmetric key for each party. In some embodiments, a single party may include various sub-parties that are distinct from one another. Therefore, a single party may have multiple symmetric keys (e.g., one symmetric key for each sub-party). As an example, the symmetric key generated by the symmetric key generation module is a random advanced encryption standard (AES) 128-bit, 192-bit, or 256-bit symmetric key. As another example, the symmetric key may use different standards such as the data encryption standard (DES) or triple data encryption standard (IDES). In other embodiments, the symmetric key generation module 225 generates one symmetric key for each party that places transactions or views transaction records of the block chain. For example, there may be N total parties interacting with the block chain. Therefore, the symmetric key generation module 225 generates N total symmetric keys.

Thus, within US2018/351750 a different encryption key is provided on a per-data-providing party basis. This presents problems in that because each data-providing party has a single symmetric key, then all of their records on the ledger are available to anyone in possession of the key—if it is necessary to grant third party access to a data providing party's data, then the third party will be able to access all of the data that is encrypted by the same key. The only mitigation against this scenario that is described is where the symmetric key is refreshed periodically. This leads to a party having several time indexed keys to access data stored on the immutable ledger within different time periods, but importantly, for any one time period all of the data providing party's data is available to a third party provided with the key for that time period i.e. it is not possible to be more granular with the definition of data that can be accessed.

SUMMARY

In order to address the above, examples of the present disclosure enable a data owner to write data in an encrypted manner to an immutable ledger, and yet still be able to grant read access to specific data elements at granular per data element level, as they were written at particular moments in time, to a requesting party. Examples therefore provide a process for encryption of data onto an immutable ledger in a time indexed manner, together with a process by which a third party can request access to the data stored in the immutable ledger from the data owner, and the data owner can provide them with certain decryption keys that allow the third party to read the data directly from the immutable ledger, again based on time-indexed queries. The data the third party can read is restricted to specific elements of the data written (so, not all of it); and within a time range/as at a point in time.

This approach has a number of advantages. Firstly, it avoids having access control implementation at a central application layer, and thereby avoids having a critical component that knows how to decrypt "all" data, and hence is a prime target of attack. Secondly, it enables the requesting party to read data directly off the ledger, even though it has been encrypted. This avoids the requesting party having to rely on the data owner to decrypt its data and pass it back—thus having the opportunity to pass back incorrect data. Thirdly, it constrains what the requesting party is able to read. The reader is only able to read specific elements. The reader is only able to read those elements as they were at a point in time, and is unable to see what the data values were before and after the timespan the reader has been granted access to.

In view of the above, from one aspect there is provided a computer implemented method of providing an immutable chain of data blocks storing immutable data for subsequent access by third party data requesting entities, comprising: receiving, from a data providing client device, data to be stored in the immutable chain, the data to be stored having one or more data fields relating to individual items of data that have semantic meaning and that may be accessed individually, and at least one temporal specification field defining a date and/or time at which the individual items of data were generated; individually encrypting the individual items of data with their own respective encryption keys, such that a different encryption key is used for different individual items of data received from the same data providing client device; encrypting corresponding respective decryption keys to the respective encryption keys with a further encryption key; forming a data block including the encrypted individual items of data and the encrypted respective decryption keys; and storing the data block within the immutable chain of data blocks as a new block therein.

In one example the forming of a data block comprises generating a hash value of the data block including the encrypted individual items of the data and the encryption key, and encrypted decryption keys and appending the hash value to the data block.

In another example the forming of a data block comprises appending a hash value from a previous block in the chain to the block prior to generating the hash value for the present data block, and signing the data block with a private key of a data owner prior to storing the block as part of the hash chain or block chain.

In one example the method further comprises: receiving a data access request from a third party data requesting entity, the data access request defining the individual items of data that are required, and a temporal specification defining the temporal point or range at which the data is requested; searching through the hash chain or block chain to identify those data blocks that meet the temporal specification; accessing the identified data blocks to retrieve the encrypted data decryption keys therein; decrypting the encrypted decryption keys; generating a response message to the third party data requesting entity including information identifying the identified data blocks, and further including the decryption keys for the individual items of data that are requested; and sending the response message to the third party data requesting entity.

In the above the response message may be encrypted with the third party data requesting entity's public key prior to sending the response message.

Moreover the response message may additionally include information identifying data blocks that temporally precede or succeed the identified data blocks. This can aid the data accessing client in being sure that the correct information is being provided.

In one example the forming of the data block including the encrypted individual items of data further comprises generating hash values of the original data items using a hash function, and including the hash values of the original data items in the data block. This feature enables the data accessing client to confirm that the data they have decrypted is a match to the data that was originally encrypted by the data owner. This can be useful when a symmetric key is used to encrypt the data, because a symmetric key carries a risk that the data owner can engineer a decryption key that causes the data in the data block to decrypt to a different value from that originally encrypted—and hence the data owner may engineer a "lie". Providing a hash of the original data prior to encryption in the data block would all the data accessing client to authenticate that the data they have received has not been tampered with.

In some examples, the immutable chain of data blocks is a hash chain or a block chain.

A further aspect of the present disclosure provides a computer implemented method for accessing data stored in an immutable chain of data blocks, the data blocks containing one or more data fields relating to individual items of data that may be accessed individually, and at least one temporal specification field defining a date and/or time at which the individual items of data were generated, the data in the data blocks being encrypted; the method comprising: generating a data access request message defining individual items of data that are required, and a temporal specification defining the temporal point or range at which the item(s) of data is requested; receiving a response message to the data access request message including information identifying data blocks in the immutable chain of data blocks that contain the requested individual items of data, and further including decryption keys for the individual items of data that are requested; accessing the identified data blocks in the immutable chain of data blocks to retrieve the individual items of data that are requested from the blocks; and decrypting the individual items of data retrieved from the data blocks to determine the properties thereof.

In one example the method further comprises generating a hash of the decrypted data and comparing this to a hash of the original data item held in the encrypted data block to confirm that the decrypted data matches the original encrypted data.

In one example the method further comprises accessing data blocks in the immutable ledger that precede and/or succeed the identified data blocks to check the date thereof whereby to verify that the accessed data meets the temporal specification.

In one example where the response message has been signed with a data owner's private key, the method further comprises authenticating the message with the data owner's public key.

In any of the above examples the individual items of data individually have semantic meaning, and hence have value to the data accessing client per se, without necessarily needing combination with other items of data.

Another aspect of the present disclosure provides a system for providing an immutable chain of data blocks storing immutable data for subsequent access by third party data requesting entities, the system comprising: at least one processor; anda computer readable storage medium storing computer-executable instructions that when executed cause the processor to operate in accordance with the method of the first aspect above.

A yet further aspect of the present disclosure provides a system for accessing data in an immutable chain of data blocks, the data blocks containing one or more data fields relating to individual items of data that may be accessed individually, and at least one temporal specification field defining a date and/or time at which the individual items of data were generated, the data in the data blocks being encrypted, the system comprising: at least one processor; and a computer readable storage medium storing computer-executable instructions that when executed cause the processor to operate in accordance with the method of the second aspect described above.

BRIEF DESCRIPTION OF THE DRAWINGS

Examples of the present disclosure will now be described with reference to the accompanying drawings, wherein like reference numerals refer to like parts, and wherein.

DETAILED DESCRIPTION

Figure 1:
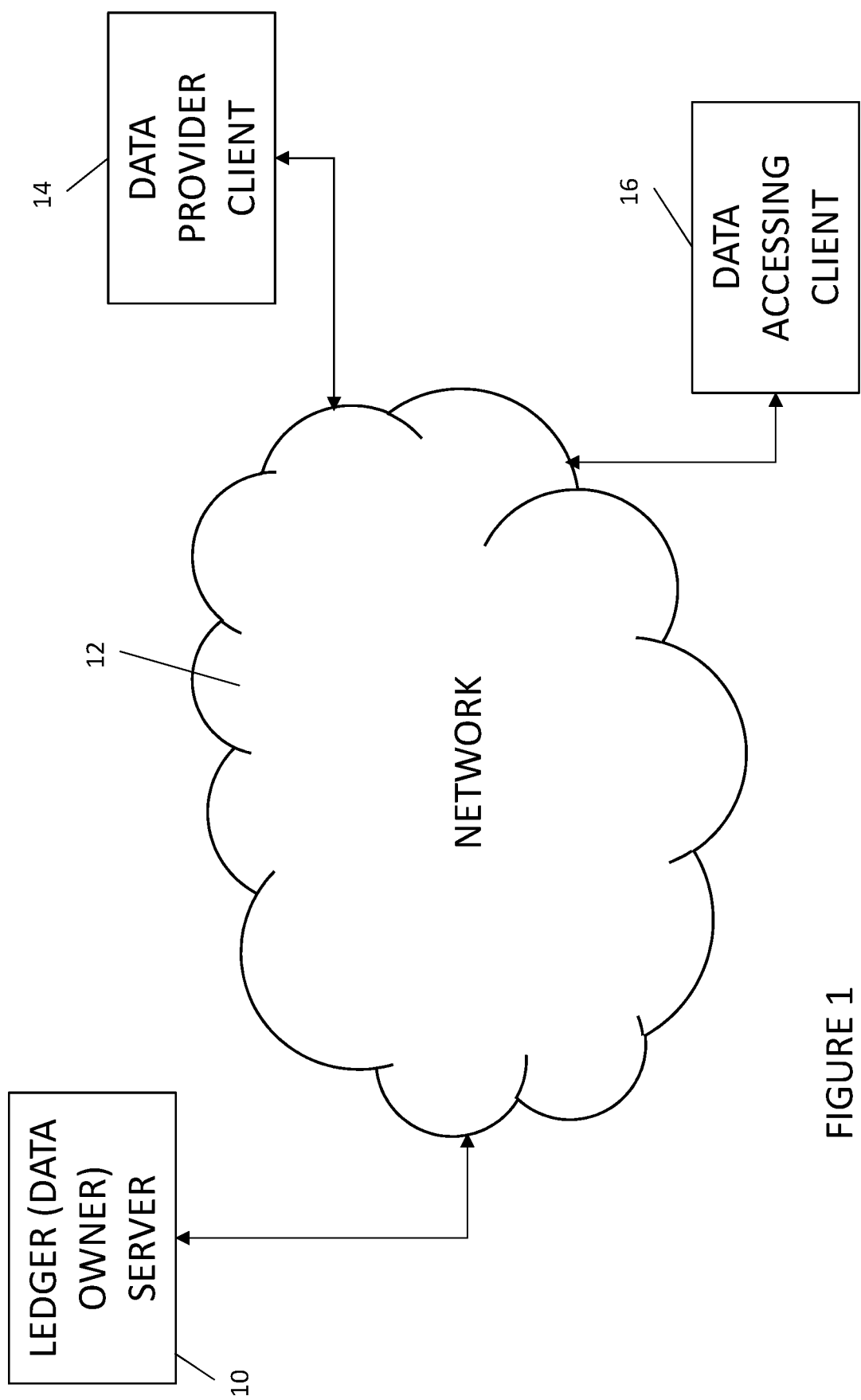
FIG. 1 is a diagram of the networked computing elements used in an illustrative embodiment.

Embodiments described herein provide a computer-implemented mechanism for an owner of encrypted data to firstly write the encrypted data to an immutable ledger, and then secondly to subsequently grant a third-party access to read from the ledger specific data elements as they were at a particular time, or within a specified time range.

In more detail, in some circumstances an owner of data may wish to write data, and subsequent changes to that data, privately to an immutable ledger that records these versions of the data. This data may include such things as personal details, IP that they have created, financial information, information relating to leisure activities, or any data that may change over time.

However, the owner of the data may also wish to grant read access to third parties in response to requests for access from them—and the third parties have the requirement to be able to read the data directly from the ledger themselves without relying on the data owner to decrypt it for them (for example, to be able to prove to themselves that this is what the data owner wrote at this moment in time). Such access requests will request access to specific elements of the data written to the ledger, either as at a point in time, or within some span of time. For example, a bank customer may wish to know what his or her account balance was at a particular point in time in the past, or over a range of past time.

In order to address this issue, embodiments described herein enable a data owner to provide a decryption key to a third party that can be used to unlock only specific elements of the data, and only as at a point in time or within a particular time range. The data owner's private key is not revealed. Using such a mechanism sensitive, time-dependent data can be stored in an immutable form in the immutable ledger in an encrypted form, and then selective access given to third party data requestors. In particular, the selective access can be selective in dependence on time, in that only data records at a particular time or within a particular time range can have access granted to them, and also selective with regards to which part of a particular record access is granted. This latter effect arises from the fact that different data fields within a particular data record can be encrypted using their own respective encryption keys, and hence the data owner can restrict to which data fields a data requestor has access in a particular record by only providing the decryption keys to the requestor for the data fields to which the data owner is content for the requestor to have access.

With respect to the immutable ledger technology that is used, it is envisaged that the immutable ledger is some immutable chain of versions of data, for example implemented using blockchain technologies, or alternatively simply as a hashchain where each entry in a database contains the hash of the previous entry. However, the actual implementation of the immutable ledger is not relevant because the aspects and embodiments described herein are agnostic to the particular immutable ledger technology used, provided that it is sufficient that each entry in the ledger will have some unique identifier (below the term "object id" is used), and it will be simple to identify the preceding and succeeding entries for the data owner in the ledger. Many existing blockchain and hashchain technologies already known in the art will meet these criteria, and hence may be used as the platform for the immutable ledger of the embodiments and aspects described herein.

To summarise the above before embarking on further detail, therefore, within illustrative embodiments described herein, therefore, the Data Provider Client (see FIG. 3 described further below) or the Ledger Server:

Encrypts the semantically meaningful data elements with different symmetric keys Encrypts the symmetric keys with its own asymmetric public key The encrypted symmetric keys and the encrypted blocks of data are stored together as a data block on the immutable ledger Having achieved the above, a Data Accessing Client wishing to read the data makes a request to the Data Provider Client (or the ledger server). If the request is granted (see FIGS. 4 & 6 described further below):

The relevant data blocks are identified

The symmetric keys necessary to decrypt the granted data elements are decrypted

The symmetric keys are then passed back to the Data Accessing Client (encrypted with their i.e. the Data Accessing Client's public key for security)

The Data Accessing Client can then decrypt the data elements within the data blocks they have been granted access to Thus, within the above, a single party (typically the Data Provider Client, but optionally the Ledger Server) encrypts the data and holds the only decryption key that can gain access to the symmetric keys used for the data records. The Data Provider Client can be asked to grant access to the data, and is able to respond with a fine-grained response that allows the Data Accessing Client to:

Decrypt only specific blocks (between two timestamps)

Decrypt only specific semantically meaningful elements of data within the block.

Within the above, by "block" is meant "block" an entire record written onto the immutable ledger—, with a "block" containing individual semantically meaningful data elements (e.g. bank balance, house value, number of children, etc), each of which are encrypted, plus the decryption keys, themselves encrypted. Hence, in the context of the present description, unless made clear otherwise, "block" does not refer to a block on a blockchain, but instead an entire record that is written to the ledger (which might be a blockchain, but could also be a hashchain or any other immutable ledger technology).

In view of the above summary, FIGS. 1 to 6 give further details of an overview of examples described herein, and then a more detailed description of a specific example is given later.

FIG. 1 illustrates the typical operating environment for one or more illustrative embodiments. Here, three separate (in this example) networked computer systems are provided, in the form of ledger server 10 belonging to and operated by the data owner, a data providing client 14 (where the data stored in the ledger is not generated by the data owner itself), and data accessing client 16. Each of the computer systems may be a general purpose computing system as is well known in the art, provided with an operating system and other software (not shown) that when executed by the computer system cause the computer system to operate in the manner described herein. In this regard, the computer systems 10, 14, and 16 communicate with each other via a network 12, for example a TCP/IP network running on conventional network infrastructure, and data and control messages can pass between the three computer systems as appropriate as described in detail below via the network 12.

Figure 3:
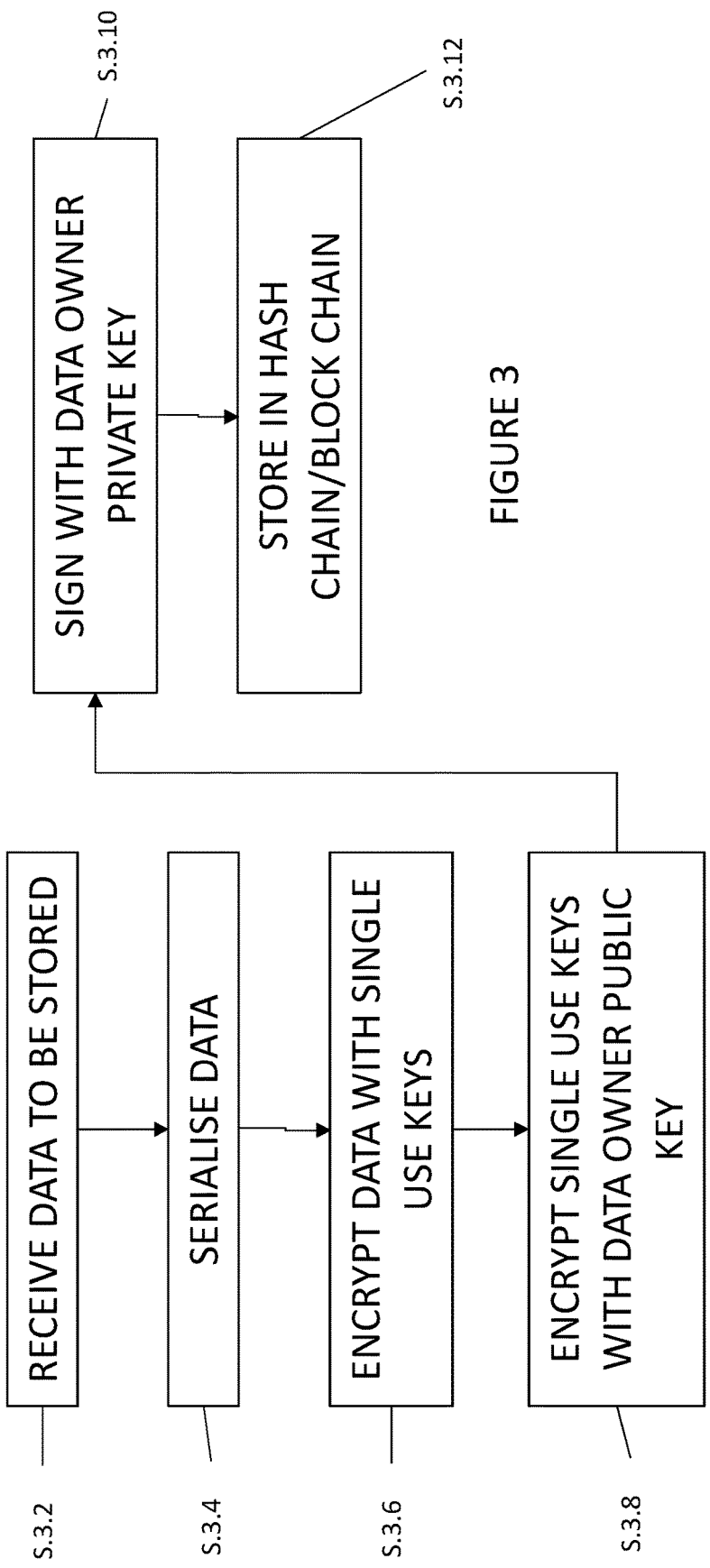
FIG. 3 is a flow diagram illustrating the process undertaken by the data ledger server in storing new data in the immutable data ledger.
Figure 4:
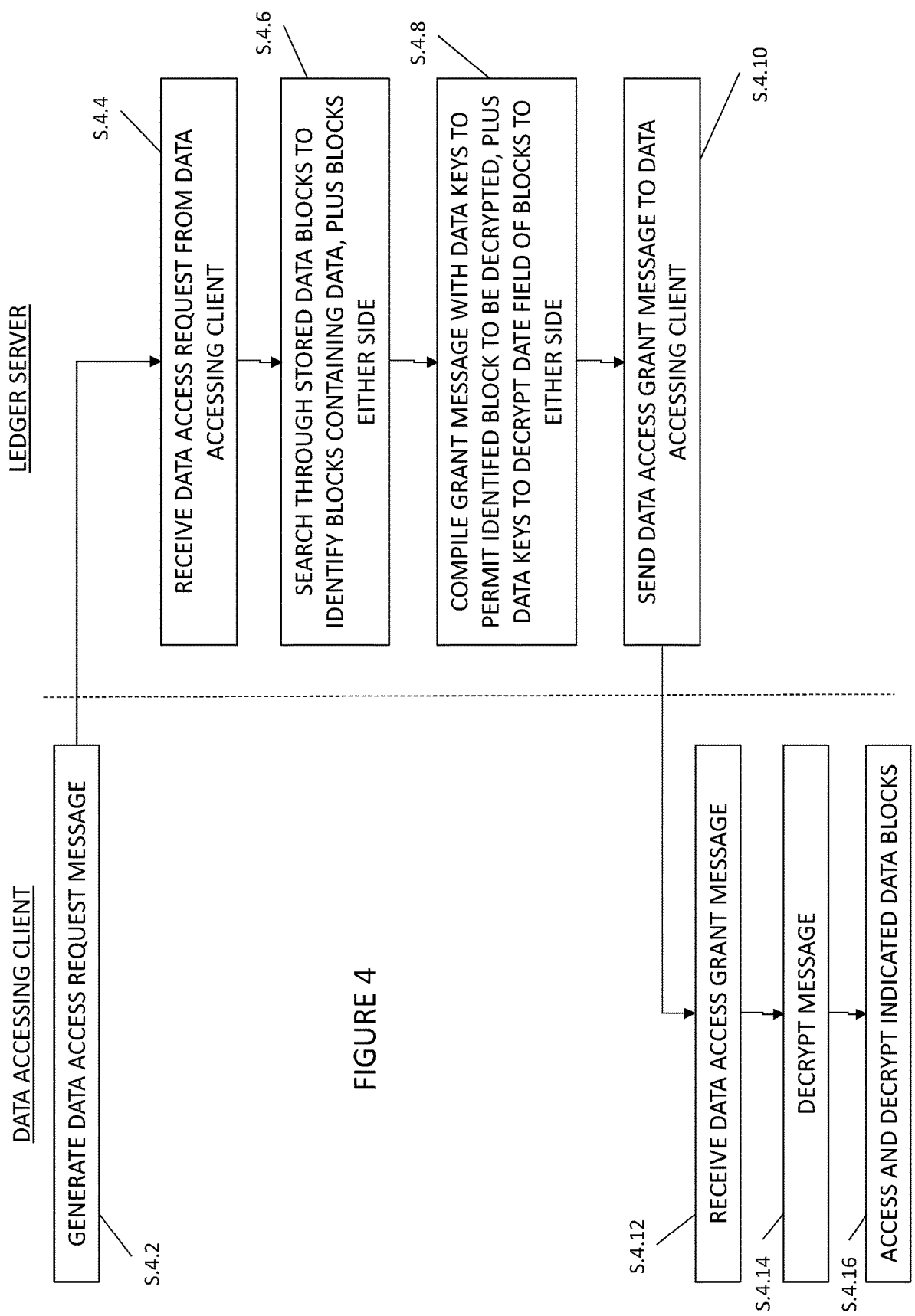
FIG. 4 is a flow diagram of the processing involved in the data accessing client and the data ledger server in providing data from the immutable ledger to the data accessing client in response to a request therefrom.

FIGS. 3 and 4 illustrate the operation of the computer systems according to the protocols defined by a first illustrative example. Referring first to FIG. 3, this shows the high level steps performed by the ledger server in firstly storing data in the immutable ledger. Firstly, at step 3.2 the ledger server 10 receives the data to be stored. This can be received from the data provider client 14 via the network 12, or may instead be generated by the ledger server itself or other systems owned by the data owner operator of the ledger server 10. At s.3.4 the ledger server serialises the data, for example in the JSON format, and then at s.3.6 it encrypts the data with single use encryption keys, for example symmetric encryption keys. A different encryption key can be used for each data field in the data record, such that at a later date when the record is accessed finer granularity control on what data fields within the record can be accessed is provided. A hash of the original value of the data field can also be stored to enable a future decryption of the data field to have the decrypted data value verified as being the same as the originally encrypted value. In this respect the storage of a hash of the original data means that when the field is later decrypted, the data accessing client (16) can confirm that the result of the decryption matches the data originally stored—preventing the data owner engineering a fake decryption key that decrypts that data held to some desired false result.

After all of the data fields in the data record have been encrypted with single use symmetric keys, the keys themselves are appended into the data record, and are then themselves encrypted using the data owner's public key, at s.3.8. Thus, at this point in time an individual data record comprises one or more data fields of data, each of which is individually encrypted with its own respective symmetric encryption key, together with the encryption keys themselves which have been encrypted with the data owner's public key. The data record is then stored in the immutable ledger at s.3.12, by being chained therein, for example as a hashchain or blockchain.

Figure 2:
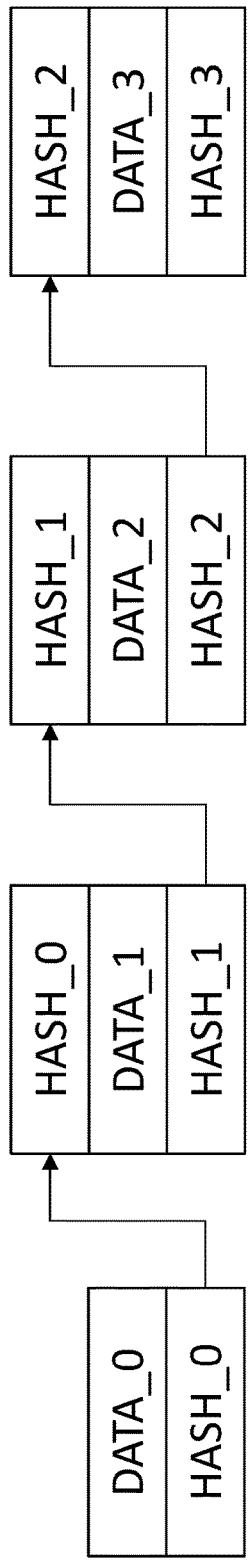
FIG. 2 is a diagram illustrating an example hashchain which may be used as the immutable ledger data structure in illustrative embodiments.

FIG. 2 shows an example hashchain, where data records Data_0, Data_1, Data_2, Data_3, ... are chained together by generating hash values of the records which are then appended to the end of the record, and also to the beginning of the next record. Hence, for example, the first record Data_0 has a first hash value Hash_0 which is the hash of Data_0 appended to the end thereof. This same first hash value Hash_0 is prefixed to the start of the second data record in the chain, Data_1, and then a hash value Hash_1 is generated of all the data that forms part of the record, i.e. Data_1 and Hash_0 together. Hash_1 is then appended to the data record Data_1, and also prefixed to the start of the next data record in the chain, Data_2. A hash value Hash_2 is then taken of Hash_1 and Data_2, which is appended to Data_2, and so on down the chain. The resulting hashchain provides immutability of the data in the data records Data_n once it is in the chain, as it is then impossible to make changes to a single data record and have the unchanged hash values later in the chain then prove to be correct. As described above, such hashchain techniques may be used as the basis for the immutable ledger, although in other embodiments then other immutable ledger technology may also be used, such as blockchains and the like, as is known already in the art. That is, embodiments described herein are agnostic to the precise immutable ledger technology that is used, and may use any known in the art.

Thus far, therefore, data records have been created and stored in the immutable ledger. FIG. 4 then illustrates the steps performed by the ledger server 10 and the data accessing client 16 to access data stored in the ledger.

Referring to FIG. 4, firstly, at s.4.2 the data accessing client 16 generates a data access request message in the prescribed format (example message formats to be exchanged between the parties will be described further later). The message is transmitted across the network 12 to the ledger server 10, where it is received and parsed at s.4.4. For example, the received message will define the type of data that is requested, and will further specify either a date at which the data is to be provided, or a date range over which the defined type of data is to be returned. Prior to commencing of the decrypt process, the ledger server should determine if it is content to grant the request, either fully or partially. Once it has been determined that it should proceed, the ledger server then begins to act in response to the received message at s.4.6., by searching through stored data blocks in the immutable ledger chain to identify blocks that contain the requested data for the requested date or date range. In addition, in order to show to the data accessing client that it is being provided with the proper data from the requested date or date range, the ledger server will also identify the data blocks in the immutable ledger chain that exist to either side of the identified block or blocks, i.e. those blocks that immediately precede or succeed the identified block (in the case of a single specified date) or blocks (in the case of a date range). When these blocks are examined by the data accessing client the client can then be reassured that it is being provided data from the blocks that relevant to the date or date range that it has requested.

Once the relevant blocks containing the data for the date or date range have been identified, together with the blocks to either side, the ledger server 10 then compiles a data access grant message containing the identifiers of the blocks, and the decryption keys for the data within the identified blocks that the data accessing client wishes to access, and including the decryption keys for the "date" field only of the blocks identified to either side temporally of the relevant blocks that contain the actual data requested. This message is compiled at s.4.8, encrypted with the data accessing client's public key, and is then, optionally, signed by the data owner to enable proof that it was the data owner that sent the message. The encrypted (and signed) message is then sent via the data network 12 to the data accessing client at s.4.10.

At the data accessing client 16, the data access grant message is then received at s.4.12, and decrypted at s.4.14 with the data accessing client's private key. The requesting party then accesses the immutable ledger chain, and specifically the particular data blocks identified in the access grant message, including all of the data blocks that contain the requested data, as well as the data blocks in the chain to either side of those data blocks. In this respect, the data accessing client can decrypt the "date" field of the data blocks that are to either side of the blocks that contain the requested data, to assure itself that it is then accessing the correct blocks. It can also, via the hash values contained within the blocks, validate the chain of blocks that it has been granted access to itself. Finally, it can then also use the decryption keys provided for the actual data block or blocks for the defined date or range of dates to access and decrypt the specific data in those blocks that it was actually trying to access in the first place. Following decryption of the data, the decrypted value can hashed and the resultant hash compared to the hash value optionally stored along with the encrypted data to verify that the decrypted value is identical to the originally encrypted data. This prevents a malicious data owner engineering a decryption key that decrypts the stored data to a desired but different value to that stored originally.

Figure 5:
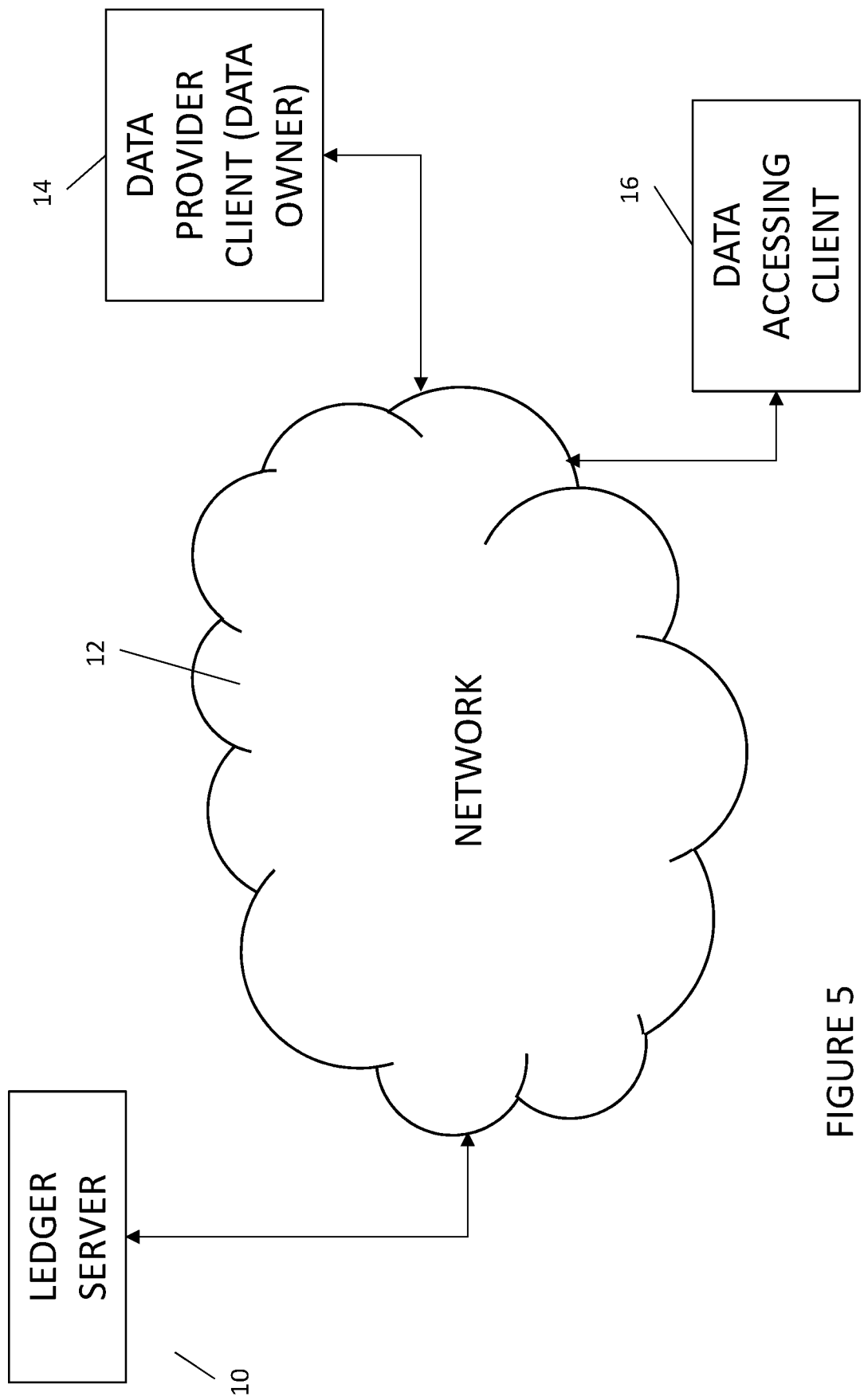
FIG. 5 is a diagram of the networked computing elements used in another illustrative embodiment.
Figure 6:
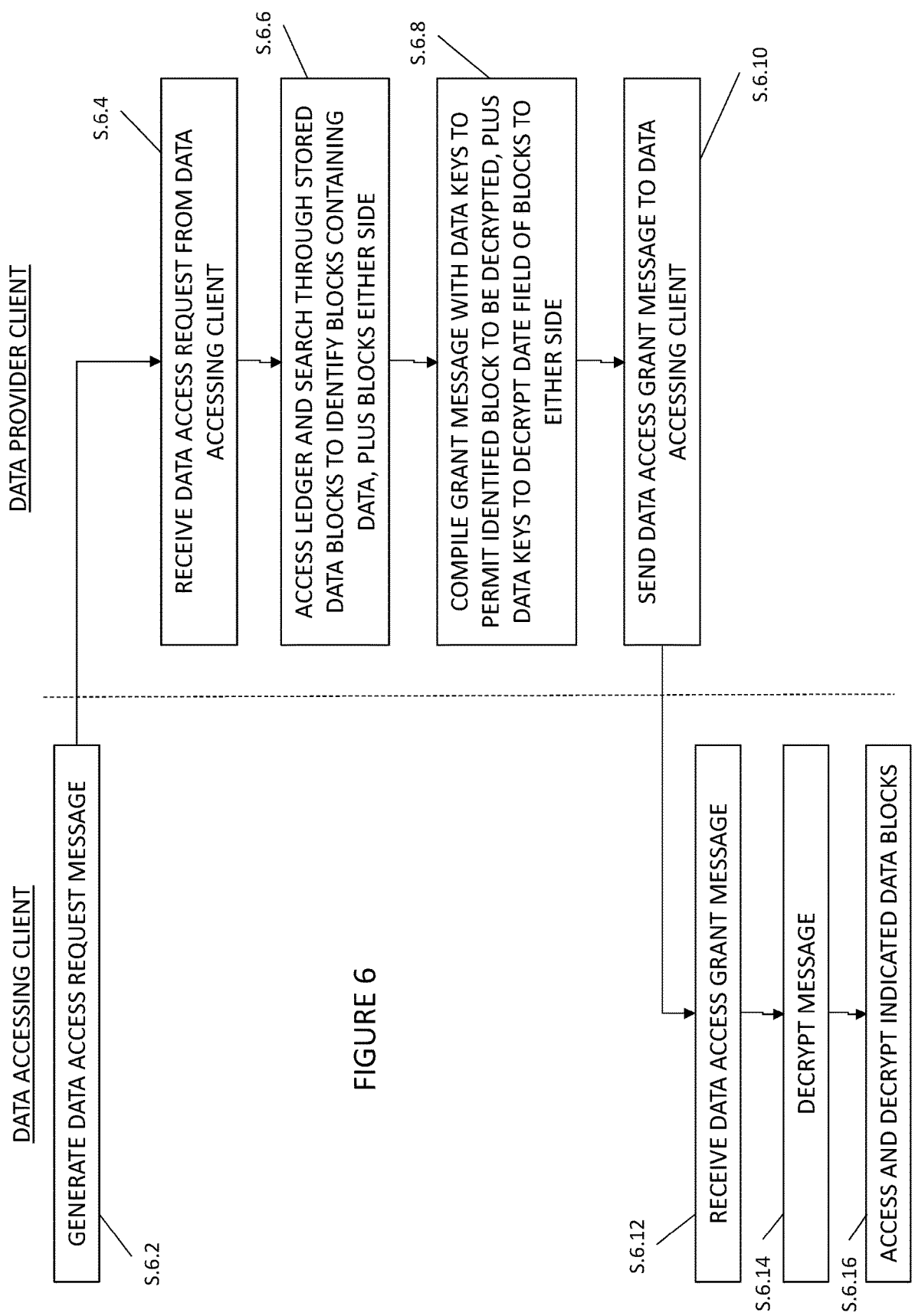
FIG. 6 is a flow diagram of the processing involved in the data accessing client and the data provider client in providing data from the immutable ledger to the data accessing client in response to a request therefrom.

A second example is shown in FIGS. 5 and 6. This example is very similar to the first example described above, but with the difference that it is the data provider client machine 14 that receives data access requests from the data accessing client 16, and then the data provider client 14 accesses the ledger 10 (which of course may be a distributed ledger across different servers) to retrieve the data and provide it to the data accessing client 16.

In this second example FIG. 5 illustrates the typical operating environment for the second illustrative example. As in the first example, here, three separate (in this example) networked computer systems are provided, in the form of ledger 10, which may be a distributed ledger stored as a hashchain or blockchain across multiple machines, data providing client 14, and data accessing client 16. Each of the computer systems may be a general purpose computing system as is well known in the art, provided with an operating system and other software (not shown) that when executed by the computer system cause the computer system to operate in the manner described herein. In this regard, the computer systems 10, 14, and 16 communicate with each other via a network 12, for example a TCP/IP network running on conventional network infrastructure, and data and control messages can pass between the three computer systems as appropriate as described in detail below via the network 12.

FIGS. 3 and 6 illustrate the operation of the computer systems according to the protocols defined by this second illustrative example. In this regard, the process of FIG. 3 in the second example is substantially the same as that of the first example, except that in this example the steps are performed by the data provider 14 rather than the ledger server 10. In this respect, in the second example FIG. 3 shows the high level steps performed by the data provider server 14 in firstly storing data in the immutable ledger. Firstly, at step 3.2 the data provider server 14 receives the data to be stored. This can be received from elsewhere via the network 12, or may instead be generated by the data provider server 14 itself. At s.3.4 the data provider server serialises the data, for example in the JSON format, and then at s.3.6 it encrypts the data with single use encryption keys, for example symmetric encryption keys. A different encryption key can be used for each data field in the data record, such that at a later date when the record is accessed finer granularity control on what data fields within the record can be accessed is provided.

After all of the data fields in the data record have been encrypted with single use symmetric keys, the keys themselves are appended into the data record, and are then themselves encrypted using the data owner's public key, at s.3.8. Thus, at this point in time an individual data record comprises one or more data fields of data, each of which is individually encrypted with its own respective symmetric encryption key, together with the encryption keys themselves which have been encrypted with the data owner's public key. Optionally the data owner may also hash the original encrypted value and include this hash value within the data record to provide assurance to a future data access client that the data they have decrypted is identical to the data originally encrypted. The data record is then passed to the ledger server (or servers) 10, and is stored in the immutable ledger at s.3.12, by being chained therein, for example as a hashchain or blockchain. Storing as a hashchain or blockchain in the ledger 10 is the same as described previously with respect to FIG. 2.

Thus far, therefore, data records have been created by the data provider, encrypted, signed, and have then been stored in the immutable ledger. FIG. 6 then illustrates the steps performed by the data provider client 14 and the data accessing client 16 to access data stored in the ledger 10.

Referring to FIG. 6, firstly, at s.6.2 the data accessing client 16 generates a data access request message in the prescribed format (example message formats to be exchanged between the parties will be described further later). The message is transmitted across the network 12 to the data provider client, where it is received and parsed at s.6.4. For example, the received message will define the type of data that is requested, and will further specify either a date at which the data is to be provided, or a date range over which the defined type of data is to be returned. Prior to commencing the decrypt process, the data provider client should determine if it is content to grant the request, either fully or partially. Once it has been determined that it should proceed, the data provider client then begins to act in response to the received message at s.6.6., by accessing the data ledger 10, and searching through stored data blocks in the immutable ledger chain to identify blocks that contain the requested data for the requested date or date range. In addition, in order to show to the data accessing client that it is being provided with the proper data from the requested date or date range, the data provider client will also identify the data blocks in the immutable ledger chain that exist to either side of the identified block or blocks, i.e. those blocks that immediately precede or succeed the identified block (in the case of a single specified date) or blocks (in the case of a date range). When these blocks are examined by the data accessing client the client can then be reassured that it is being provided data from the blocks that relevant to the date or date range that it has requested.

Once the relevant blocks containing the data for the date or date range have been identified, together with the blocks to either side, the data provider client then compiles a data access grant message containing the identifiers of the blocks, and the decryption keys for the data within the identified blocks that the data accessing client wishes to access, and including the decryption keys for the "date" field only of the blocks identified to either side temporally of the relevant blocks that contain the actual data requested. This message is compiled at s.6.8, encrypted with the data accessing client's public key, and is then, optionally, signed by the data owner to enable proof that it was the data owner that sent the message. The encrypted (and signed) message is then sent via the data network 12 to the data accessing client at s.6.10.

At the data accessing client 16, the data access grant message is then received at s.6.12, and decrypted at s.6.14 with the data accessing client's private key. The requesting party then accesses the immutable ledger chain, and specifically the particular data blocks identified in the access grant message, including all of the data blocks that contain the requested data, as well as the data blocks in the chain to either side of those data blocks. In this respect, the data accessing client can decrypt the "date" field of the data blocks that are to either side of the blocks that contain the requested data, to assure itself that it is then accessing the correct blocks. It can also, via the hash values contained within the blocks, validate the chain of blocks that it has been granted access to itself. Finally, it can then also use the decryption keys provided for the actual data block or blocks for the defined date or range of dates to access and decrypt the specific data in those blocks that it was actually trying to access in the first place. The data accessing client 16 may also hash the decrypted value in the data records and compare this hash to the hash value optionally stored by the data owning client along with the encrypted data to confirm that the data resulting from the decryption is identical to the data originally encrypted.

With both of the above arrangements, therefore, the following advantages are obtained:

i) the data accessing client is assured that it is being provided data from the requested date or date range, because it is also provided with access to the data fields in the blocks that are temporally immediately preceding or following the blocks to which substantive data access is given i.e. to substantive data stored in the blocks, rather than simply meta-data about the blocks themselves;

ii) only the data accessing client itself can access the data in the blocks, because it is provided with the symmetric encryption keys that are themselves encrypted with its own public key. Hence any eaves dropper on the communications between the data accessing client and the ledger server will still not be able to gain the symmetric keys to allow access to data in the ledger;

iii) because the data accessing client is being provided with the decryption keys, it is able to read data directly from the immutable ledger itself without any third party having to intervene—the data accessing client then does not need to trust any other party;

name/value pairs) will be used, together with the term "data element"—being a name/value pair. Actual implementation could use any appropriate method of serialising the data into structures similar to these.

Encryption of Data Prior to Writing to Ledger

Step 1—Serialisation of the Data

The data to be written to the ledger by a data provider client 14 will be expressed in some data serialisation format, such as JSON, including a date, representing the point in time at which this data is correct; such that it can then be encrypted and written into the ledger.

Optionally, data values that are generated by third parties, such as in this example, the bank balance and value of house, could be digitally signed by the party that generated them, and this signature would be included in the data object. This is shown in this example.

Crucially this data includes a "date" data element which identifies the point in time at which this data is true.

Example:

```
{
Data    : { // Data object
Date                                    : "2018-03-10T12:34:55Z",
    Surname                             : "Smith",
First-name                              : "John",
Marital-status                              : "Married",
Date-of-Birth                           : "1970-10-21",
Current-account-balance   : {
        i.value                         : 1356,
        ii.sig                          :
            0x1972560c7df0c28668cb969c0952e2a6888e0d662c0fc925
            69ff62e6a08e07caa811b318dad704ebe243bc0d3edfc95fc0
            e394efb8dd908f0737fdf8be3ea64231e10d9fbc1882050dbb
            eeaaf0a0b390
},
Surveyed-value-of-house   : {
        iii.value                       : 350000,
        iv.sig                          :
            0x16ba484d995c3d518a10b5ea074b7cc30c84a87fc48e3edf
            7e513366f24b2f7b24ed62a80ec11eceedafd657e757cf0c94
            bf62c9f7976aac1f2e4207ed3de3e768fdc75ba3fbbf2e9d11
            748ff3eec2d
}
}
}
}
``` iv) the data accessing client can confirm that the decrypted values it has are a match to the data that was originally encrypted.

In order to further understand the examples of the present disclosure, a more detailed description of a worked example will be given, including example file formats and the like. It should be understood that the example file formats to be described and shown are for illustrative non-limiting purposes only. The details in the following detailed description are applicable to either of the first or second examples described above, mutatis mutandis.

The explanation of the detailed embodiment includes the following steps:

The process by which data in encrypted prior to being written to the ledger

The process by which a request for data access is granted

The process by which the requester accesses the data on the ledger

Within this detailed description, the examples will show data serialised in JSON format, with dates expressed using the ISO8601 format (yyyy-mm-ddThh:mm:ss:[.mmm]Z). JSON nomenclature of "name/value pairs" (e.g. data-of-birth=01-Jan-1970) and "object" (being a collection of Step 2—Encryption with Single-Use Keys Each data element is then encrypted with a single-use (one time pad) key, typically using a standard symmetric key encryption algorithm. The critical requirement here is that the key is single use only; and hence many keys will be required. As such symmetric key encryption is recommended (but is not mandatory) as generation of many single use symmetric keys is substantially simpler and more performant than generation of multiple asymmetric key pairs. Crucially a different key is used for each data element.

Optionally, a hash of the original data is created and stored along with the encrypted data to provide assurance to a future data accessing client that the decrypted value is a match to the data originally encrypted—a risk with using single-use asymmetric encryption is that a decryption key could be engineered to create a valid decryption that results in a data value that is not as originally encrypted.

The keys that are used are written into a second object along with a repeat of the date at which the data in the data object was true.

Both the name and value are encrypted, and the name is replaced by an identifier—this hides not only the data values held, but encrypts what the data refers to (name, date of birth etc.).

Example:

```
{
Data : { // Data object - each data element now encrypted
        i.// plus (optionally) the hash of the original data
    Element1 : {
        ii) Value : 0xd6e82b7053a66f0690d70ebe2d961a21,
        iii) Hash : 0x2131338678d75f24bba2cc40288ccba2 },
    Element2 : {
        iv) Value : 0x4759e9e81d413611516ed2e9625b3ced,
        v) Hash : 0xa76126e62edfb4e4b5cebbe2175fc37c },
    Element3 : {
        vi) Value : 0xdbd639bfc85cbde4e7449216f5f63d27,
        vii) Hash : 0x1acef1806157354ef409343aac218f0e },
    Element4 : {
        viii) Value : 0xa33b633c8de3bbdd4b7b32cb9fa2aeaa,
        ix) Hash : 0x065abd49de38ea648f5604f2078c0074 },
    Element5 : {
        x) Value : 0xd16467583548c29bd91d5fcca9fb9343,
        xi) Hash : 0xfa402c6b45a79e9379a0fab1ba7dc47d },
    Element6 : {
        xii) Value :
            0x44a82c18347cff7fc585967a6136cc288af5f2d35b4f6d41e0
            a99199f9422a32fe307b9e5a743f6bae2d512d8ae47d00d4ef3c6
            ecc2d45a172b913e0190d1ee75b746ec556a7e302235035640afe
            dcb1ebdc77f7431512c450619463fa292b9ebec7ee2e1754f881d
            96e297a5be5ea1e,
        xiii) Hash : 0x9895757465f415be4674875385a6cd78 ),
    Element7 : {
    Value :
        0xc0ed83febe3d75de9ecf8d0232baf74359454e44602f846d7f80dc34fd
ca9598c4927496ad9e8622064983c6fe0777a5e9f27a5d8942086d043d54c
05b2a561069631d75afd8bacab3556039f2c3da489e8cea98be4310619968
5e1caef7c6c71f8fcf054196687fe3a16e90e99425a1,
    Hash : 0xc23c47f26428f717532dcb80cf0ddacc }
}
Keys : { // Keys object
Date : "2018-03-10T12:34:55Z",
Keyset : { // Set of keys used - one use, one per element
    xiv) Element1 : {
        i.Name : "Date",
        ii.Key : 0xd496ca7d5175b63a18acb9325ecc27c1 },
    xv) Element2 : {
        i.Name : "Surname",
        ii.Key : 0x14404f7d60d2bd63988a823e58fd5f8b },
    xvi) Element3 : {
        i.Name : "First-name",
        ii.Key : 0xc5ba3f4995868d76a8c6eed313200ead },
    xvii) Element4 : {
        i.Name : "Marital-status",
        ii.Key : 0x16060196894a3c40c28e8b4d3a6fe2b1 },
    xviii) Element5 : {
        i.Name : "Date-of-birth",
        ii.Key : 0x62a6998b4e426af2af75bc0565d1d41c },
    xix) Element6 : {
        i.Name : "Current-account-balance",
        ii.Key : 0x4909d5525d87e8ee97e94d05aea2e60a },
    xx) Element7 : {
        i.Name : "Surveyed-value-of-house",
        ii.Key : 0x202184342e2f680e6faabe188dca2599 }
    xxi) }
} // end of Keys object
}
```

Step 3—Encryption Using Data Owner's Public Key and Signing

The Keys object is encrypted using the data owner's public (asymmetric) key, making it readable only by the data owner using their private key. Finally, the entire object is signed by the data owner's private key, proving it was them that created it.

This final output of the process, containing the encrypted data and key objects would be written to the immutable ledger. As indicated in the introduction, the immutable ledger will generate unique identifiers for the object when it is written into the ledger, and will chain this object to its predecessor (the previous version of this data), for example by using a hash function to generate a hash value of the previous version of the data i.e. the previous block (in encrypted form), which hash value is then appended to the new encrypted block being generated. These identifiers allow the objects to be retrieved at a later date, and the chain allows the previous and next entries in the chain to be identified.

Example:

```
{
Data : { // Data object - each data element now encrypted
        i.// plus (optionally) the hash of the original data
    Element1 : {
        ii) Value : 0xd6e82b7053a66f0690d70ebe2d961a21,
        iii) Hash : 0x2131338678d75f24bba2cc40288ccba2 },
    Element2 : {
        iv) Value : 0x4759e9e81d413611516ed2e9625b3ced,
        v) Hash : 0xa76126e62edfb4e4b5cebbe2175fc37c },
    Element3 : {
        vi) Value : 0xdbd639bfc85cbde4e7449216f5f63d27,
        vii) Hash : 0x1acef1806157354ef409343aac218f0e },
    Element4 : {
        viii) Value : 0xa33b633c8de3bbdd4b7b32cb9fa2aeaa,
        ix) Hash : 0x065abd49de38ea648f5604f2078c0074 },
    Element5 : {
        x) Value : 0xd16467583548c29bd91d5fcca9fb9343,
        xi) Hash : 0xfa402c6b45a79e9379a0fab1ba7dc47d },
    Element6 : {
        xii) Value :
            0x44a82c18347cff7fc585967a6136cc288af5f2d35b4f6d41e0
            a99199f9422a32fe307b9e5a743f6bae2d512d8ae47d00d4ef3c6
            ecc2d45a172b913e0190d1ee75b746ec556a7e302235035640afe
            dcb1ebdc77f7431512c450619463fa292b9ebec7ee2e1754f881d
            96e297a5be5ea1e,
        xiii) Hash : 0x9895757465f415be4674875385a6cd78 ),
    Element7 : {
    Value :
        0xc0ed83febe3d75de9ecf8d0232baf74359454e44602f846d7f80dc34fd
ca9598c4927496ad9e8622064983c6fe0777a5e9f27a5d8942086d043d54c
05b2a561069631d75afd8bacab3556039f2c3da489e8cea98be4310619968
5e1caef7c6c71f8fcf054196687fe3a16e90e99425a1,
    Hash : 0xc23c47f26428f717532dcb80cf0ddacc }
}
Keys : { // Keys object - now encrypted
Encrypted-data :
0x55dc449ac82cba427187752b907bbdef977010ccd86e956169630c26984
d793fdc4749b440065275cc123aad11a13e2f4b9c2c8f84964963f45a1b8e
74cafc748c5a0927f33412ee3e2dece35f1704049f07bd0a8e3086fa3c9af
03115fdef5326106386deada370a493fe3ad8ac7514c049e671869ccb3bfa
b39b0dd6641f34e128c3565d8f3424ed27b18abbb07a99f308e2467d1dfdb
7d8e84a8459f968eebfab8353435ecf4e8a16c899bfebc3031424000b04bf
3267888161bd7d66dedcd0f4a85d4b745d2dcc5224c9ba86294b66faae521
8504358eaab5944a03982e0b11576f0a554a3e6f645be01bf45133b6695d7
c52e596942a8038726b85821bcd26e35bec00c32938bf20bf41a59a6eab3d
4c60c065ff2543db395b28cdba9e46deb117b48f92f9d5e95fa5902017516
666c1d84219dd72fd90579589c6038ff78db38d7151000817e94564953906
cc07b4005194b6598e6ca20f27b6e56cfa97f0fc2f71111239d357fca0358
79780dc98f54192ce0af919b19833888cfdc838fa9df3bf534738b648f200
6b713d979
}
Signature : { // Signature of data owner
    xiv) <standard digital signature>
}
Version-chain : { // Created by the immutable ledger technology
Object-id       : 0x8502c78d6d8585f2f3dccdc94be8c666,
Prev-object-id  : 0x2d7ee3da97db39c747d4af11a4151ec6
}
}
```

Process on Change of Data

When the data changes, the entire data block will be recreated with its "data" and "keys" objects, using new single-use keys to encrypt the data elements. The date element is used to show when this new data is valid from. It is implicit that the previous version of the data is valid from its "date" element up to the moment directly before the "date" element of this version of the data.

This new block will then be written to the ledger as the new version of the truth as at that point in time, and the immutable ledger technology will generate a new object id and maintain the chain for this data.

Process of Granting a Request for Access to the Data

A third party data requestor i.e. data accessing client 16 wishes to request access to specified elements of the data held, as at a point in time, or across a time span. This process follows the following steps:

A request is made by a requesting party (the "data requestor")

The request is validated, and a response is generated

The requesting party uses the response to access the data

The Request

The requesting party will need to be able to specify what data element(s) they wish to access in a manner that the data owner can map to the data element(s) held—for example if the request is for "name", the data owner may grant access to "surname" and "first-name" data elements. Typically, the requester will specify exactly which data elements they wish to access.

The requesting party makes their request of the data owner. This must include the data element(s) the requesting party wishes to access and the date/time, or time range, that they wish to access data for.

It is expected that this request would be signed by the requester, and encrypted using the data owner's public key (making it readable only by the data owner).

Example request for data elements "marital-status", "current-account-balance", "surveyed-value-of-house" as at $12^{th}$ March 2018 08:00:00

```
{
Request  : { // Request object
Request-type           : "at point in time",
Date                   : "2018-03-12T08:00:00Z",
Data-elements          : [
     i. "Marital-status",
     ii. "Current-account-balance",
     iii. "Surveyed-value-of-house" ]
}
Signature : { // Signature of requester
<standard digital signature>
}
}
```

The Response

The data owner will validate the request and may:

Refuse it—in which case a "request refused" message is returned (not discussed further)

Grant partial data access

Grant the data access requested in full

If the response is to be fully or partially granted then, the data owner will progress the following process:

Identify the data object(s) that the requester is to be granted access to, plus the objects directly before and after the time span (see note below on "date" elements to be extracted)

Extract the one time use keys that were used to encrypt the data elements that the third party is being granted access to Create a response to the third party the includes these keys and the identifier of the data objects they are used in, together with sufficient date data element keys to enable the requesting party to confirm that the data they have is complete and within the timespan The data owner traverses the data objects it has written, optionally using some internal indexing process to rapidly identify the data objects that are needed for performance reasons. Actual implementation of this is dependent on the underlying immutable ledger technology.

For each object, the Keys object is decrypted such that the date element can be read—this continues until the object(s) that contain data at the correct points in time are identified.

Once the correct object(s) has been identified, the required keys are extracted and are formed into a message for the requesting party.

In this example, one object is found, and the appropriate keys are extracted to grant the access request.

"Date" data elements are extracted

The requesting party will wish to validate for itself that the data really is the data at the point in time they requested.

Hence the data owner will also provide the minimum keys for the "date" data element as follows:

Where the request is for data at a point in time:

The date element for the data returned (the first object), which will be before the requested point in time The date element for the next object in the ledger's chain, which will be dated after the requested point in time.

Where the request is for a timespan, then the date elements for the following objects will need to be returned:

The date element of the first object returned, which will have a date that is before the start of the timespan (proving there was no more data prior to the start of the time span)

Optionally, the date element of the remaining objects that fall within the timespan—see note below The date element of the last object returned, which will have a date that is before the end of the time span (indicating this object is within the time span)

The date element of the next object in the ledger's chain, which will be dated after the end of the time span (proving there was no more data that should have been returned)

Where a requesting party does not need the actual date of change of the data requested, just what the values were, then the dates of objects between the first and last object do not need to be returned. For example: if the requesting party wishes to confirm that at no point did a value cross some boundary condition (e.g. the current account balance never dropped below zero) then the dates of the data change are not required.

Creation of the Response

As per the description above on what "date" data elements to return, the key to the date data element in the object is extracted, and the next object in the chain is also found, and the key for its date element is also extracted. This will provide proof that the provided data is as at the point in time requested.

The response is formed containing these keys, signed by the data owner and encrypted using the requesting party's public key (making it readable only by the requesting party). An example response is shown below.

```
{
Response : { // Response object
Response-type : "full-grant",       // Same structure for partial
                                       grant
Date-keys        : {
    i) Num-objects : 1,// 1 object only - need "first" and
                          "next" dates
    ii) // Date for this object - before requested point in
              time
    iii) First-object  : {
         i.Element1 : {
         ii.Object-id : 0x1c7c8f8acdafaf584892ab02b3d59989,
         iii.Name : "Date",
         iv.Key : 0xd496ca7d5175b63a18acb9325ecc27c1 },
         v.}
```

-continued
```
      iv) },
      v) // No "Last-object" as this is an "at a point in time"
         request
      vi) // Date for next object - after requested point in
         time
      vii) Next-object  : {
           i.Element1 : {
           ii.Object-id : 0x6bb4edebee38062dc096b23f58692165,
           iii.Name : "Date",
           iv.Key : 0xb56c6f00a69a2ddce17e9779a9d5e42f },
           v.}
      viii) }
   },
   Objects : [ // Array of objects the requester needs
      ix) Keyset : { // key set is the object-id, plus the keys
            needed
            i.Object-id : 0x8502c78d6d8585f2f3dccdc94be8c666,
            ii.Element4 : {
            iii.Name: "Marital-status",
            iv.Key : 0x16060196894a3c40c28e8b4d3a6fe2b1 },
            v.Element6 : {
            vi.Name: "Current-account-balance",
            vii.Key : 0x4909d5525d87e8ee97e94d05aea2e60a },
            viii.Element7 : {
            ix.Name : "Surveyed-value-of-house",
            x.Key : 0x202184342e2f680e6faabe188dca2599 }
      x) }
   ]
}, // end of response object
Signature : {
   xi) <standard digital signature>
}
}
```

The Requesting Party Access the Data They have Requested

The requesting party receives the response data, decrypts it and confirms that it has been signed by the data owner.

The requesting party will then access the object(s) in the ledger identified by the object id(s) returned in the response, and extract the data object for each. The requesting party can also examine the hash value in the data object from the ledger, and access the preceding data object in the ledger in encrypted form, and re-generate the hash value from the preceding object for comparison with the hash in the object of interest. Provided that the two hash values match then then requesting party can be assured that the immutable chain of objects is intact, and the data can be trusted as being the same as when written.

Example:

```
Data : { // Data object - each data element now encrypted
      i.// plus (optionally) the hash of the original data
Element1 : {
      ii) Value : 0xd6e82b7053a66f0690d70ebe2d961a21,
      iii) Hash : 0x2131338678d75f24bba2cc40288ccba2 },
Element2 : {
      iv) Value : 0x4759e9e81d413611516ed2e9625b3ced,
      v) Hash : 0xa76126e62edfb4e4b5cebbe2175fc37c },
Element3 : {
      vi) Value : 0xdbd639bfc85cbde4e7449216f5f63d27,
      vii) Hash : 0x1acef1806157354ef409343aac218f0e },
Element4 : {
      viii) Value : 0xa33b633c8de3bbdd4b7b32cb9fa2aeaa,
      ix) Hash : 0x065abd49de38ea648f5604f2078c0074 },
Element5 : {
      x) Value : 0xd16467583548c29bd91d5fcca9fb9343,
      xi) Hash : 0xfa402c6b45a79e9379a0fab1ba7dc47d },
Element6 : {
   xii) Value :
         0x44a82c18347cff7fc585967a6136cc288af5f2d35b4f6d41e0
         a99199f9422a32fe307b9e5a743f6bae2d512d8ae47d00d4ef3c6
         ecc2d45a172b913e0190d1ee75b746ec556a7e302235035640afe
         dcb1ebdc77f7431512c450619463fa292b9ebec7ee2e1754f881d
         96e297a5be5ea1e,
   xiii) Hash : 0x9895757465f415be4674875385a6cd78 ),
Element7 : {
Value :
   0xc0ed83febe3d75de9ecf8d0232baf74359454e44602f846d7f80dc34fd
   ca9598c4927496ad9e8622064983c6fe0777a5e9f27a5d8942086d043d54c
   05b2a561069631d75afd8bacab3556039f2c3da489e8cea98be4310619968
   5e1caef7c6c71f8fcf054196687fe3a16e90e99425a1,
   10 Hash : 0xc23c47f26428f717532dcb80cf0ddacc }
}
```

Using the keys that were supplied in the response the requesting party can now decrypt:

The date of this, the "first" object

The date of the "next" object

The data in elements 4, 6 and 7 to retrieve the original data written by the data owner.

Example:

This ("first") object date:

Date : "2018-03-10T12:34:55Z"

. . . proving the data changed prior to the date asked for—12$_{th}$ March 2018 08:00:00

Next object date:

Date : "2018-03-14T07:12:02Z"

. . . proving the data next changed after the date asked for—12$_{th}$ March 2018 08:00:00

Data elements:

```
Marital-status                          : "Married",
Current-account-balance                 : {
      i.value                           : 1356,
      ii.sig                            :
         0x1972560c7df0c28668cb969c0952e2a6888e0d662c0fc925
         69ff62e6a08e07caa811b318dad704ebe243bc0d3edfc95fc0
         e394efb8dd908f0737fdf8be3ea64231e10d9fbc1882050dbb
         eeaaf0a0b390
},
Surveyed-value-of-house                 : {
      iii.value                         : 350000,
      iv.sig                            :
         0x16ba484d995c3d518a10b5ea074b7cc30c84a87fc48e3edf
         7e513366f24b2f7b24ed62a80ec11eceedafd657e757cf0c94
         bf62c9f7976aac1f2e4207ed3de3e768fdc75ba3fbbf2e9d11
         748ff3eec2d
}
```

Optionally the data accessing client can now hash the data elements that have been decrypted and compare the resulting hash value with the value stored in the Hash element of the data block of the encrypted data. If the hashes match then this will indicate that the decrypted data definitely matches the data originally encrypted into the data block.

Data Within a Timespan

The requesting party may want to access all data within a time span—between two dates.

The process is essentially the same as above—the response message returned contains an array with one keyset per object that falls within the timespan requested. The keys for the dates of the first and last object in the timespan, plus the "next" object—the first object beyond the timespan—are also returned to enable the requester to validate that they have received all objects (and only all the objects) that fall within the requested time span.

The requesting party iterates over the entries in the ledger, extracting and decrypting the data in the objects identified in the response message; and validates that the dates of the first, last and next object prove they have a complete set of all objects requested.

The above described processes therefore enable data written to a public, immutable ledger—such as a blockchain—to be encrypted such that it cannot be read by anyone but the data owner who wrote the data in the first place; while allowing data access requests to be granted in a manner such that:

The requesting party is able to read data directly from the ledger, rather than having to trust another party (such as the data owner) to decrypt it for them.

The requesting party is only able to read the specific data elements to which they have been granted, and only as those data elements as they were at the point in time (or within a time span) requested.

The requesting party cannot see data elements at other times or other data elements The requesting party can confirm that the decrypted data is as was originally encrypted The data owner's private key remains private Various modifications, whether by way of addition, deletion, or substitution may be made to the above described embodiments to provide further embodiments, any and all of which are intended to be encompassed by the appended claims.

The invention claimed is:

1. A computer implemented method of providing an immutable chain of data blocks storing immutable data for subsequent access by third party data requesting entities, comprising:

receiving, from a data providing client device, data to be stored in the immutable chain of data blocks, the data to be stored including individual items of data that have individual semantic meaning and are individually accessible, and at least one temporal specification field defining a date and/or time at which the individual items of data were generated;

individually encrypting the individual items of data with respective encryption keys, such that a different encryption key is used for different individual items of data received from the same data providing client device;

encrypting respective decryption keys corresponding to the respective encryption keys with a further encryption key different from the respective encryption keys;

forming a data block including the encrypted individual items of data and the encrypted respective decryption keys; and storing the data block within the immutable chain of data blocks as a new block therein, wherein the method further comprises:

receiving a data access request from a third party data requesting entity, the data access request defining the individual items of data that are requested by the third part data requesting entity, and a temporal specification defining a temporal point or range at which the individual items of data are requested;

searching through the immutable chain of data blocks to identify data blocks that meet the temporal specification;

accessing the identified data blocks to retrieve the encrypted decryption keys therein;

decrypting the encrypted decryption keys;

generating a response message to the third party data requesting entity including information that identifies the identified data blocks, and further including the decrypted decryption keys for the individual items of data that are requested; and sending the response message to the third party data requesting entity.

2. The method according to claim 1, wherein the forming of the data block comprises: generating a hash value of the data block including the encrypted individual items of the data and encrypted respective decryption keys, and appending the hash value to the data block.

3. The method according to claim 1, wherein the forming of the data block comprises appending a hash value from a previous data block in the immutable chain of data blocks to the data block prior to generating a hash value for the data block, and signing the data block with a private key of a data owner prior to storing the data block within the immutable chain of data blocks.

4. The method according to claim 1, and further comprising encrypting the response message with a public key of the third party data requesting entity prior to sending the response message.

5. The method according to claim 1, and further including in the response message information identifying data blocks that temporally precede or succeed the identified data blocks.

6. The method according to claim 1, wherein the forming of the data block including the encrypted individual items of data further comprises generating hash values of the individual items of data using a hash function, and including the hash values of the individual items of data in the data block.

7. The method according to claim 1, wherein the immutable chain of data blocks is a block chain.

8. A computer implemented method for accessing data in an immutable chain of data blocks, the method comprising:

receiving, from a data providing client device, data to be stored in the immutable chain of data blocks, the data to be stored including individual items of data that have individual semantic meaning and that are individually accessible, and at least one temporal specification field defining a date and/or time at which the individual items of data were generated;

individually encrypting the individual items of data with respective encryption keys, such that a different encryption key is used for different individual items of data received from the same data providing client device;

encrypting respective decryption keys corresponding to the respective encryption keys with a further encryption key different from the respective encryption keys;

forming a data block including the encrypted individual items of data and the encrypted respective decryption keys;

storing the data block within the immutable chain of data blocks as a new block therein;

generating a data access request message defining individual items of data that are requested, and a temporal specification defining a temporal point or range at which the individual item(s) of data are requested;

receiving a response message to the data access request message including information that identifies data blocks in the immutable chain of data blocks that contain the requested individual items of data, and further including respective decryption keys for the individual items of data that are requested, a different respective decryption key being required for different individual items of data originating from a same data providing client device;

accessing the identified data blocks in the immutable chain of data blocks to retrieve the individual items of data that are requested from the blocks; and decrypting the individual items of data retrieved from the data blocks using the respective decryption keys for the individual items contained in the received response message to determine the properties thereof.

9. The method according to claim 8, and further comprising generating a hash of a decrypted individual item of data and comparing this to a hash of the encrypted individual item of data held in the data block to confirm that the decrypted individual item of data matches the encrypted individual item of data.

10. The method according to claim 8, and further comprising accessing data blocks in the immutable chain of data blocks that precede and/or succeed the identified data blocks to check a date thereof whereby to verify that the accessed data correspond to the temporal point or range defined in the temporal specification.

11. The method according to claim 8, wherein the response message has been signed with a data owner's private key, the method further comprising authenticating the response message with a public key of the data owner.

12. A system for providing an immutable chain of data blocks storing immutable data for subsequent access by third party data requesting entities, the system comprising:
    at least one processor; and
    a computer readable storage medium storing computer-executable instructions that when executed cause the at least one processor to operate so as to:
    receive, from a data providing client device, data to be stored in the immutable chain of data blocks, the data to be stored including individual items of data that have semantic meaning and that are individually accessible, and at least one temporal specification field defining a date and/or time at which the individual items of data were generated;
    individually encrypt the individual items of data with respective encryption keys, such that a different encryption key is used for different individual items of data received from the same data providing client device;
    encrypt respective decryption keys corresponding to the respective encryption keys with a further encryption key different from the respective encryption keys;
    form a data block including the encrypted individual items of data and the encrypted respective decryption keys; and
    store the data block within the immutable chain of data blocks as a new block therein,
    the system being further arranged to:
    receive a data access request from a third party data requesting entity, the data access request defining the individual items of data that are requested by the third part data requesting entity, and a temporal specification defining a temporal point or range at which the individual items of data are requested;
    search through the immutable chain to identify data blocks that meet the temporal specification;
    access the identified data blocks to retrieve the encrypted decryption keys therein;
    decrypt the encrypted decryption keys;
    generate a response message to the third party data requesting entity including information that identifies the identified data blocks, and further including the decrypted decryption keys for the individual items of data that are requested; and
    send the response message to the third party data requesting entity.

13. The system according to claim 12, wherein the forming of the data block comprises: generating a hash value of the data block including the encrypted individual items of the data and encrypted respective decryption keys, and appending the hash value to the data block.

14. The system according to claim 12, wherein the forming of the data block comprises appending a hash value from a previous data block in the immutable chain of data blocks to the data block prior to generating a hash value for the data block, and signing the data block with a private key of a data owner prior to storing the data block within the immutable chain of data blocks.

* * * * *